June 24, 1958
F. M. MORA
2,840,515
SINGLE CIRCUIT PROCESS AND A PLANT FOR PRODUCING
A SERIES OF PRODUCTS USING WOOD
AS STARTING MATERIAL
Filed Aug. 12, 1952
5 Sheets-Sheet 1
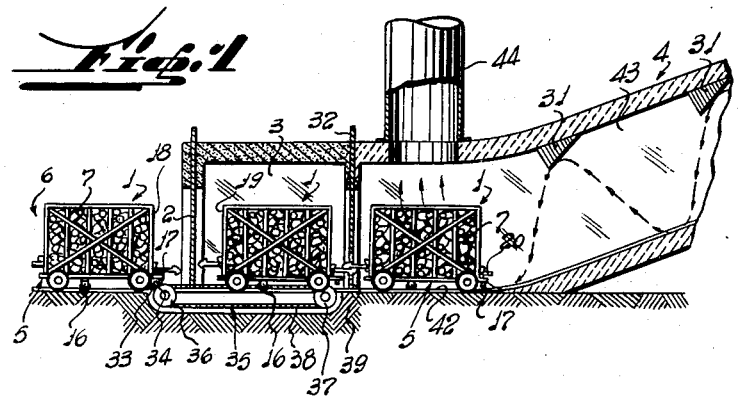
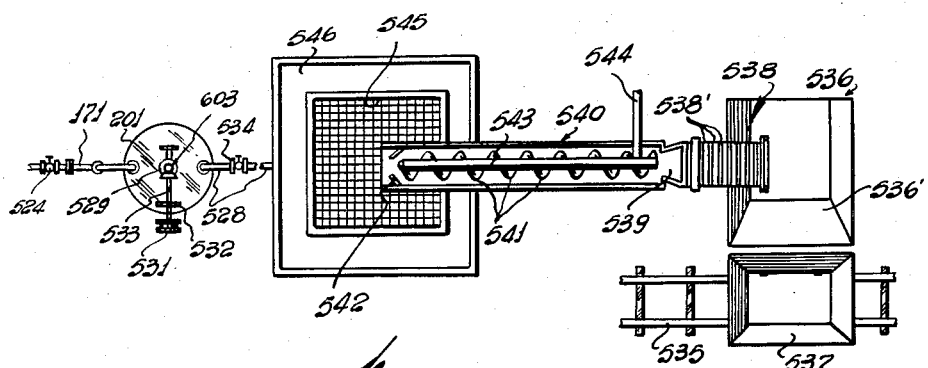
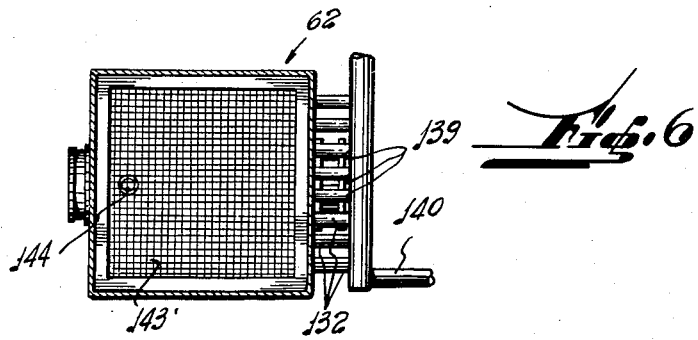
INVENTOR.
Fernando Mario Mora
BY Ivan P. Tashof,
Attorney June 24, 1958 F. M. MORA 2,840,515
SINGLE CIRCUIT PROCESS AND A PLANT FOR PRODUCING
A SERIES OF PRODUCTS USING WOOD
AS STARTING MATERIAL
Filed Aug. 12, 1952 5 Sheets-Sheet 3

INVENTOR.
Fernando Maria Mora
BY
Attorney

June 24, 1958

F. M. MORA 2,840,515

SINGLE CIRCUIT PROCESS AND A PLANT FOR PRODUCING
A SERIES OF PRODUCTS USING WOOD
AS STARTING MATERIAL

Filed Aug. 12, 1952

INVENTOR.
Fernando Mais mora
BY

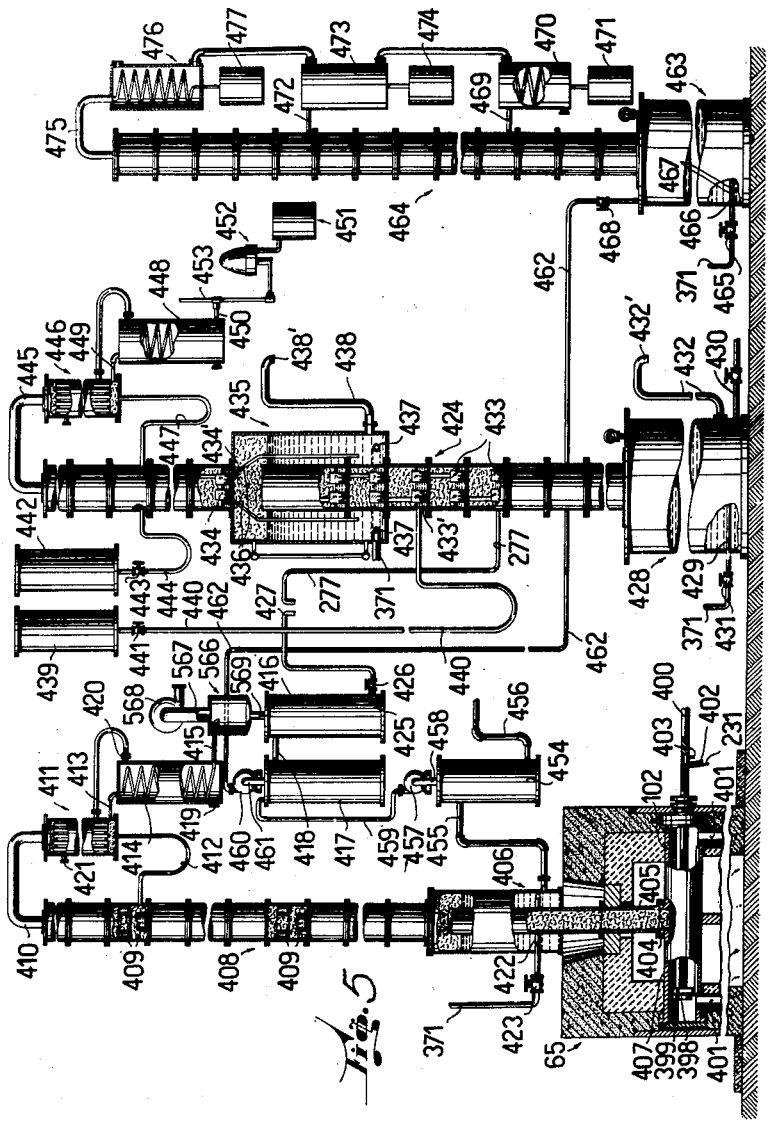

United States Patent Office 2,840,515
Patented June 24, 1958

2,840,515

SINGLE CIRCUIT PROCESS AND A PLANT FOR PRODUCING A SERIES OF PRODUCTS USING WOOD AS STARTING MATERIAL

Fernando Mario Mora, Buenos Aires, Argentina

Application August 12, 1952, Serial No. 304,026

2 Claims. (Cl. 202—57)

This invention relates to a new process for producing a series of products arising from wood carbonization.

More particularly, the invention relates to a continuous process for producing a series of products using wood as the starting materials. This process comprises carbonizing wood, collecting and cooling the resulting charcoal, collecting the gaseous products produced during carbonization, separating insoluble tar from said gaseous product, simultaneously removing soluble tar and pyroligneous acid from the remaining gaseous product by cooling to an intermediate temperature at which substantially only said soluble tar and said pyroligneous acid are condensed, said condensation being accompanied by treatment with an acid such as sulphuric or tannic acid, separating said pyroligneous acid from said soluble tar, neutralizing said separated pyroligneous acid with calcium hydrate to produce a calcium acetate liquor and decomposing said calcium acetate liquor to produce acetone.

From the above statements it can be conceived that it is an object of the present invention to provide a process for producing a series of products by carbonizing wood, in a single continuous cycle. By "single continuous cycle" is to be understood a number of steps as a whole which are performed without discontinuity.

This and further objects and advantages of the present invention will become evident during the following description in which, in order to facilitate the understanding of the invention reference is made to several figures showing by way of example preferred embodiments of the invention.

In the drawings:

Figure 1 is a schematic side elevation, partly in section, of the admission and of the preheating tunnel with its instrumentalities and accessories in one of its preferred embodiments.

Figure 5 is a side elevation, partly in section, of the acetone and by-products producing equipment starting from the calcium acetate liquor.

Figure 6 is a plan view along the line VI—VI of Figure 3.

Figure 7 is a schematical plan view of a calcium oxide hydrating equipment.

Figure 2:
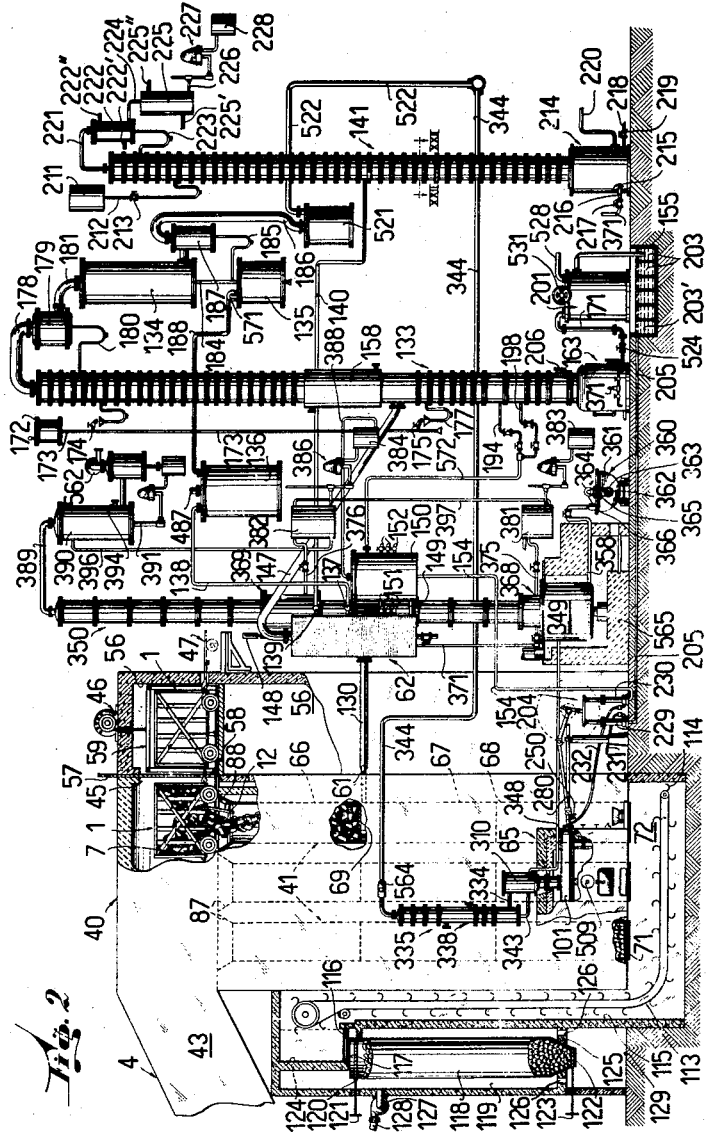
Figure 2 is a schematic side elevation, partially in section, of the main parts of the plant of the present invention, some of which parts have been shifted in order the better to show the lay-out.

It is considered convenient to place the plant of the present invention near the forest or artificial plantation to be carbonized, or if this is not possible, near a transport station. In either case it is advisable to build a broad rail net for the wood transport-waggons or basket-waggons 1 (see Figure 1), which will be later explained, which are able to transport lumps of wood of an adequate size for the wood carbonizing retorts and for feeding the plant on such a scale as to avoid interruptions in the operation of the plant.

The rail net should lead towards an admission door 2 of an antechamber 3 of a wood drying and preheating tunnel 4 (see Figure 1), later on identified as "preheating tunnel."

Each of the basket-waggons 1 comprises a platform 5 supporting a basket 6 of sufficiently strong structure for transporting a considerable charge of wood 7, the volume of which should preferably be equal to that of a primary chamber 66 of a retort 41 (see Figures 2 and 3), as will be explained later on. It is advisable that the baskets 6 be so built that they provide the largest possible spacings, called contact surfaces, for the lumps of wood 7, so that said lumps may contact the drying and preheating gases of preheating tunnel 4, as will be seen in due time.

The net of rails for the basket-waggons 1 requires besides the pair of conventional rails for the wheels 11, a middle rail for the control wheel 16 controlling a discharge 12 (see Figure 2) thereof. If the middle rail is removed and provided that the waggon 1, or at least the part corresponding to the discharge door 12 is positioned above an adequate cavity, said discharge door 12 will automatically open and the charge of wood 7 will be discharged from said waggon 1 into said cavity which, as will be seen later on, is the primary chamber 66 of a retort 41.

Each basket-waggon 1 comprises furthermore a coupling projection 17 mounted on the lower face of platform 5 and coaxially with the control wheel 16 and at the front end of said waggon 1.

Finally each waggon 1 is provided with automatic coupling devices 20 mounted on the front 18 and back 19 of the basket 6.

A train of waggons 1 is formed, which train is directed towards the admission door 2 of the preheating tunnel 4 (see Figure 1), for subjecting the lumps of wood 7 to the carbonization process.

The carbonizing retorts 41 which will be described later on (see Figure 2), are arranged in at least one row and the heating gases are passed on the outside of said retorts 41 for heating them and for carrying out the carbonization of the wood arranged inside said retorts 41. The heating gases are collected by the preheating tunnel 4 for drying and preheating the wood in the basket-waggons 1 which move slowly in said preheating tunnel 4.

The percentage of water contained in the different types of wood is of considerable importance for the carbonization. Said water in said wood produces two important drawbacks, of which the first one consists in the necessity of evaporating it as far as possible before subjecting the wood to carbonization, and the second is that the dilution of the resulting pyroligneous acid from the condensation of the evaporated water entails an increase in fuel cost and time for its distillation which is very important.

The heating of the wood produces up to approximately 160° C. nothing but water and therefore from the economical and industrial viewpoint it is convenient to eliminate said water before subjecting the wood to the actual carbonization process.

It is possible to dry the wood economically without requiring any special fuel expenses for that purpose by taking advantage of the waste calories of the combustion gases resulting from the retort heating and from the other heating systems of the plant and cooling equipment for the charcoal. In order to achieve this result said hot gases are forced to pass through the wood in the basket-waggons 1, before they reach the chimney 44.

By means of that previous drying action it is possible to introduce the lumps of wood substantially dehydrated into the retorts, which produces the following advantages:

(a) A considerable reduction in fuel expenses for heating the retorts, which amounts approximately to 50%, since the required calories for evaporating the water which the wood contains is almost equal to the calories which are required for its complete carbonization.

(b) The time of carbonization is reduced to approximately 50%, that is to say that the efficiency of the retorts is duplicated.

(c) The condensing apparatus are reduced by approximately 30%, as far as the refrigerating surfaces are concerned, with the consequent economy in cooling water for the refrigeration.

(d) The pyroligneous acid is approximately 50% more concentrated which also represents an economy on the apparatus and equipments for treating said pyroligneous acid specially in the latter part of the process where it is transformed mainly into acetone, as will be later explained.

To carry out this previous drying and preheating of the lumps of wood in the plant of the present invention, a wood drying and preheating tunnel 4 is built of reinforced concrete duly insulated to avoid as much as possible any loss of heat by radiation. The basket-waggons 1 with their charges of wood advance inside said tunnel 4 at such a speed that the run is accomplished in approximately 18 to 20 hours, which time is necessary for substantially dehydrating the wood and preheating it to approximately 150° C. It is obvious that the required time varies in accordance with the condition in which the wood is and the type of wood used. The preheating tunnel 4 is provided along its entire length with screens 31 which counteract the tendency of the hot gases to remain in the upper part of the arch of the tunnel 4, and bearing in mind the displacement of the gases towards the chimney 44, these screens 31 produce an undulatory movement of the gas flow whereby a longer path of the gases in the tunnel 4 is obtained and at the same time the temperature in each cross-section of the tunnel 4 is more uniform.

The flow of the hot gases is in opposite direction to the advance of the waggons 1. Thus the gases which are more saturated with humidity are precisely where they should be and that is at the starting point of the path of the waggons 1 in the preheating tunnel 4, which is the part where the wood is still very damp. Due to this arrangement the drying action of the hot gases on the wood is not too quick and the surfaces of the lumps of wood do not contract whereby the evaporation of the water from the core part of the lumps of wood is also perfectly well achieved.

In order to avoid the entry of substantial air masses from the outside towards the inside of the preheating tunnel 4 during the successive entries of the basket-waggons 1 into said preheating tunnel 4, the latter is provided with the ante-chamber 3. This antechamber 3 comprises an admission door 2 (see Figure 1) which connects the outside with the inside of the preheating chamber and a dividing panel 32 which separates the preheating tunnel 4 from the antechamber 3. The length of the antechamber 3 is slightly greater than the length of a waggon 1.

However, if it is desired to charge simultaneously two or more successive waggons into the preheating tunnel 4, it would only be necessary to provide an antechamber 3 of suitable length and the operative apparatus of the disengaging mechanism 33 would have to be varied, as will be understood immediately.

The disengaging mechanism 33, only schematically shown in Figure 1, includes the finger 34 of a chain driving mechanism 35 which engages the coupling projection 17.

The schematically shown chain driving mechanism 35 consists of two gears 36 and 37, of which one, for instance gear 37 is the driving gear, over which gears a chain 38 provided with said finger 34, runs. The driving mechanism 35 is capable of advancing the uncoupled waggon 1 towards the antechamber 3 and after the admission door 2 is opened, also into said antechamber 3.

It is obvious that instead of a chain 38 and gears 36 and 37 any other adequate type of driving means may be used.

Once the basket-waggon 1 has entered antechamber 3 the admission door 2 is closed again, whereby the inside of said antechamber 3 is substantially isolated from the outside.

The dividing panel 32 has at its lower central part a slot 39 which allows the passage of the coupling device 20 of the basket-waggon 1 which last entered the antechamber 3 even though the dividing panel 32 is closed and bearing in mind that the driving mechanism 35 displaces the waggon 1 in the antechamber 3 towards said panel 32, its front coupling device 20 will couple said waggon to the back coupling device of the waggon in front of it and already housed in the preheating tunnel 4, which coupling is performed in the way as previously described.

When the finger 34 during its movement reaches the driving gear 37 it uncouples the driving mechanism from the projecting stop 17 and operates a switch (not shown) which in turn operates a commanding device (not shown), for raising the dividing panel 32 and thus allowing the entrance of the last waggon just coupled to the train of waggons, into the interior of the preheating tunnel 4. Said finger 34 continues its movement and operates afterwards at the exact moment a second switch (not shown) which closes the dividing panel 32 at the same time as it stops the movement of the driving mechanism during a short time prior to starting the following operation similar to the one described, which time is necessary in order to advance the train of waggons in the tunnel 4.

The preheating tunnel 4 comprises an upper platform portion 40, (see Figure 2) which is a substantially horizontal section into which in the embodiment here described debouch all the upper ends of the retorts 41 a substantially horizontal base portion 42 (see Figure 1) which is adjacent to the dividing panel 32 and an inclined portion 43 relating the base portion 42 with the upper portion 40 and completing the tunnel 4.

The chimney 44 is arranged above the base portion 42 and allows the exit of the gases to stack.

As new basket-waggons 1 added to the train of waggons inside the preheating tunnel 4, the waggons which have discharged their load into the retorts 41 must be also lowered to earth. With regard to the way of discharging the load of the waggons 1, an explanation will be given in due time when the retorts 41 are described.

Taking it, therefore, for the time being, that the empty waggons 1 reach the end portion 45 of the preheating tunnel 4, these waggons 1 are lowered to earth by means of a lift 46, schematically illustrated, which operates in combination with a coupling and driving mechanism 47 which is the source for advancing the train of basket-waggons 1 in the preheating tunnel 4.

Lift shaft 56 contains the lift cabin 59 which is at that moment in the position shown in Figure 2, and exit door 57, comprises a slot 58 similar to slot 39 of the dividing panel 32 (see Figure 1).

The exit door 57 has a purpose similar to that of the dividing panel 32 (see Figure 1) that is to say, it tends to avoid the loss of considerable volumes of preheating gases coming from the heating channel of the retorts 41.

As has already been explained, in this embodiment of the plant of the present invention a plurality of aligned retorts 41 are provided, so that all the upper parts of said retorts 41 debouch into the upper platform portion 40 of the preheating tunnel 4. The number of retorts 41 depends on the productive capacity of the plant and on the type of wood used. Should the productive capacity of the plant be very high, it is convenient to arrange several parallel rows of retorts 41 with a corresponding net of rails for the basket-waggons 1. Each of said retorts 41 is provided with a gas collecting tube 61 for collecting the gaseous products which are separated from the wood during the distillation and said collecting tubes 61 end all in a general collecting duct 130 which forwards the distilled products to a tar separator 62 to which reference will be made later on.

Figure 4:
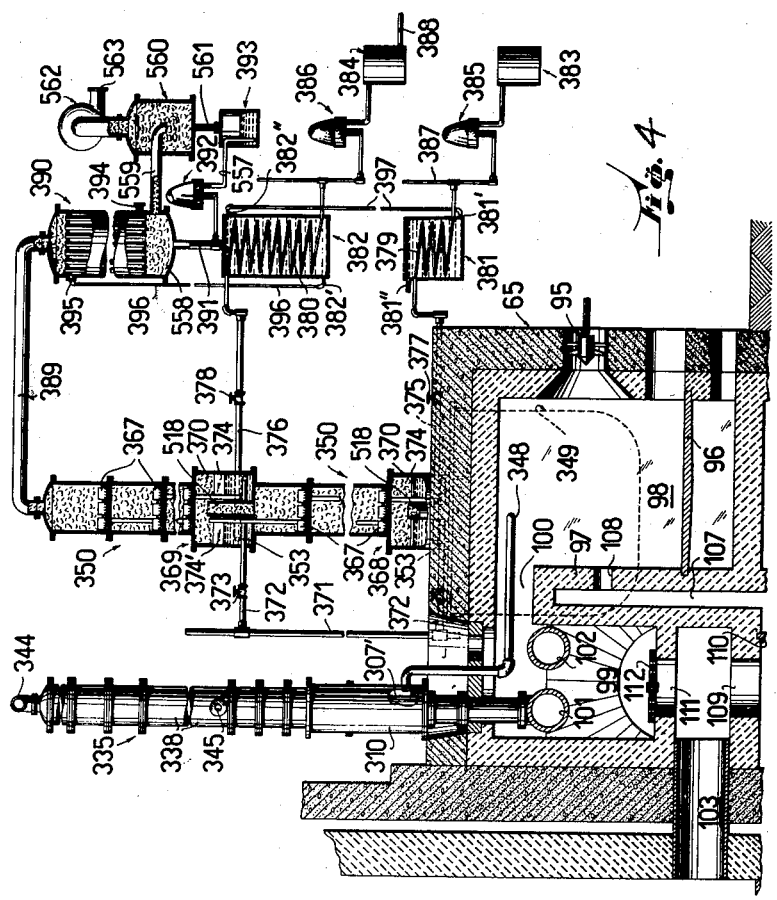
Figure 4 is an end view, partly in section, of the hydrocarbon rectifying tower in relationship with the tar cracking cylinder and the cylinder for thermic decomposition of the calcium acetate liquor, and in which the driving unit of the scraper piston is not shown.

As may be best seen in Figure 4, each retort 41 is arranged inside a housing of refractory material 63. A channel 64 is arranged between the outside of said retorts 61 and the housing 63 through which pass the heating gases produced in a furnace 65.

Each retort 41 is formed of a primary chamber 66, a secondary chamber 67 and a final chamber 68. Each of said chambers is separable from the others by a movable panel of similar structure. In order to identify said panels, panel 85 will be called the admission panel, which separates the tunnel 4 from the inside of the primary chamber 66, the first panel, which is panel 69 separates the primary chamber 66 from the secondary chamber 67; the second panel, which is panel 70 separates the secondary chamber 67 from the final chamber 68 and the discharge panel which is panel 71 separates the bottom of the final chamber 68 from a discharge space 72.

Although the following description of one of said panels will be made mainly with regard to the first panel 69, it is understood that the remaining panels 70, 71 and 85 are of similar structure with the exception of panel 85 which includes a further accessory, as will be seen later on.

The cylindrical wall of each retort 41 is provided at the height of the dividing panels and, in the particular case under consideration, of the first panel 69, with a semicircular upper ring 73 and a semicircular lower ring 74 parallelly spaced from each other so that the corresponding part of the edge of the panel 69 is capable of penetrating thereinto. The cylindrical wall of the retort 41 is furthermore provided with a semicircular slot 75 so that the panel 69 may be withdrawn from the interior of the retort 41. To this end the panel 69 is provided with at least two ears 76 (only one of which is visible in the drawings) which support a cross-block 77. One end portion 78 of a screw 80 passes through said cross-block 77 and is provided at its free end with a tension head (not visible) which is rotatably held by said block 77. A duct 81 linked by its inner end 79 to the retort 41 passes through the chamber 64 and housing 63 towards the outside. The outside end 82 of said duct 81 is provided with a gasket 523 and a screw threaded bushing 83 forming a nut for the screw 80. The gasket 523 isolates the interior of the duct 81 from the outside. A hand wheel 84 enables to operate the screw 80 and to remove the panel 69 so as to establish a connection between the primary chamber 66 and the secondary chamber 67.

The primary chamber 66 is isolated from the preheating chamber 4 by the admission panel 85, the structure and operation of which is similar to the panels 69 to 71 with the addition of an accessory in its middle part which accessory consist of a piece of rail 86 for the control wheel 16.

If the primary chamber 66 has to be charged with a new charge of lumps of wood (and it is understood that to this effect said chamber 66 is empty) the hand wheel 84 is operated so as to withdraw the admission panel 85 together with its piece of rail 86 whereby the next basket-waggon 1 which will pass over the retort 41 under consideration, will open its discharge door 12 as shown in Figure 2 and thereby discharge its contents into the primary chamber 66.

A hopper 87 prevents lumps of wood from falling into the gas channel 64 when a basket-waggon 1 discharges its content into a primary chamber 66 of a retort 41. As has already been explained, it is preferable that the charge of wood of one waggon 1 fill the space or volume of the corresponding chamber 66. Upon the waggon 1 continuing its movement, with its discharge door 12 opened, the latter will be automatically closed by means of a cam 88 (see Figure 2) arranged inside the retort 41. Once the primary chamber 66 is charged and after the train of waggons has continued its displacement, the corresponding hand wheel 84 is operated to close the primary chamber 66 by means of the admission panel 85, whereby the following waggons will pass over said retort 41 without opening their discharge door 12.

Once the admission panel 85 is closed, the first panel 69 is opened to a small extent, so as to establish communication between the primary chamber 66 and the secondary chamber 67, for a purpose which will be later explained.

Between the upper part of the final chamber 68 and the lower part of the secondary chamber 67, an exterior duct 89 is provided which connects the said two chambers 67 and 68. Part of said exterior duct 89 passes through the channel 64 through which the heating gases produced in the furnace 65 rise, so that the distilling gases produced by the wood under carbonization in final chamber 68, which pass through exterior duct 89 to the secondary chamber 67 do not condense while flowing through said exterior duct 89.

The section 89' of said exterior duct 89, which section corresponds to the secondary chamber 67, is provided with a prolongation 90. A sliding valve 91 is displaceably mounted in said prolongation 90 and separates the exterior duct 89 from the outside. During the carbonization, inspections must be made as will be seen later on, as to whether the wood housed in the final chamber 68 has concluded its carbonization process, which inspections are carried out by shifting the slide 92 towards the section 89' of the exterior duct 89 as shown in broken lines, whereby the gases which are produced in the final chamber 68, if still produced, pass out through said prolongation 90. On the other hand if the carbonization is concluded no gases will leave the prolongation 90 and the absence of gases indicates to the operator that the carbonization of the wood housed in the final chamber 68 is concluded.

In order to obtain the maximum efficiency of the heating gases produced in the furnace 65 for heating said retorts 41, chamber 64 is provided with a helix 93 which forces the gases to displace themselves helically around each retort, and after concluding the helical path said gases enter the preheating tunnel 4 through the openings 94 arranged between the outer face of the hopper 87 and the housing 63.

The carbonization process is carried out as follows:

It is understood that upon first starting the operation of the retorts 41 or after an interruption in the operation, the three chambers 66 to 68 must be successively charged with lumps of wood and the panels should be closed with the exception of the first panel 69, which should be slightly opened so as to establish communication between the primary and the secondary chambers 66 and 67, respectively. The heating gases produced in the furnace 65 which enter the channel 64 pass sufficiently slowly therethrough in order to release a large part of their calories for carbonizing the wood. Once the charge of chamber 68 is completely carbonized, it is discharged.

The explanation of whereto the charcoal which passes through the opening corresponding to the discharge panel 71 is discharged will be given later on.

It is obvious that the heating gases rising from the furnace 65 transfer part of their heat during their path towards the openings 94. When entering the channel 64 they will transfer the first part of their heat which is at the highest temperature to the final chamber 68, whereby the charge in said chamber 68 will be carbonized earlier than the charge located above said final chamber 68. Once final chamber 68 is empty the charge corresponding to the secondary chamber 67 is passed to the final chamber 68, by operating the panel 70. Once the charge of the secondary chamber has been passed to the final chamber 68 the second panel 70 will be again closed in order to separate the final chamber 68 again from the secondary chamber 67. Similarly the charge of the primary chamber 66 which is less carbonized than the charge which was passed from the secondary chamber 67 to the final chamber 68 will be passed from the primary chamber 66 to the secondary chamber 67. The first panel 69 is again closed after the charge has passed and the admission panel 85 is opened, whereby a new charge from a basket-waggon 1 is introduced into the primary chamber 66. Once the primary chamber 66 is filled with wood, the admission panel 85 is again closed, obviously after the waggon 1 has discharged its contents and continued its movement for a sufficient distance so that cam 88 has closed, the discharge door 12. The first panel 69 is opened to a small extent in order that the gases which are produced by the wood in the primary chamber 66 may pass to the secondary chamber 67.

Intermittent inspections are carried out to ascertain the state of carbonization in the final chamber 68, by means of the sliding valve 91, as previously explained, and as soon as the carbonization is concluded, the content of the final chamber 68 is discharged by withdrawing the discharge panel 71, to which end the corresponding handwheel is operated. Once the charcoal of the final chamber 68 has been discharged, panel 71 is closed again and the semicarbonized wood of the secondary chamber 67 is passed to the final chamber 68 and a similar operation is carried out with regard to the wood which has only started its carbonization in the primary chamber 66 and which is passed to the secondary chamber 67 whereby the primary chamber 66 is again empty and the above described steps are repeated.

As has already been stated, the gases which are produced during the distillation in each retort 41 are collected by the corresponding collecting tube 61.

The vertical retorts 41 herein proposed have several advantages, such as the facility of charging and discharging them with regard to the currently used horizontal systems which consist of large and long horizontal retorts wherethrough basket-waggons charged with wood pass very slowly. This layout has several drawbacks such as that the free spaces which remain between the wood inside the basket-waggons and the walls of the retort are very large, which is partially due to the fact that the horizontal retort must have such cross-sections so as to allow the passage of the wood with the waggon through it. In other words the ratio between the volume of wood and the volume of the retort is very low. Furthermore, in the horizontal arrangement it is a really difficult proposition to lead the hot gases through said horizontal retorts in such a way as to obtain uniform heat distribution. Bearing in mind the above drawbacks, it is necessary:

(a) That the wood stay for a longer time in the retort than it might.

(b) The productive capacity for an equal volume of charge space of retort is smaller than that of the equipment hereinproposed.

(c) The fuel cost for carbonizing is higher because the ratio of the volume of the horizontal retort with regard to the volume of wood under carbonization is lower, nevertheless said retort must be at substantially the same temperature.

(d) In view of the fact that during the wood carbonization, tar is distilled, it often happens that parts of said tar drop on the bearings of the basket-waggon wheels seizing up the shafts in the bearings and producing derailments in the tunnel with the obvious consequences.

Comparing the above drawbacks with the only advantage of said horizontal system, that it is possible to carbonize larger lumps, the vertical system herein proposed is found to be more convenient, since the fact that it is possible to use larger lumps of wood in a horizontal system is only a relative advantage because it should not be forgotten that it is easier to charge small lumps of wood (for instance, 35 cm. long and up to say 15 or 20 cm. diameter) into the basket 6 of the waggon 1 then to arrange large pieces of wood on the special waggons for the horizontal system.

It is advisable to use in the retort equipment according to the present invention cylindrical retorts having a diameter not exceeding approximately 1.50 m. because the heat transmission coefficient towards the longitudinal axis of each retort 41 decreases considerably when the diameter of the retort is increased, and this would produce the following drawbacks:

(a) More time needed for complete carbonization.

(b) It is possible that in the core part corresponding to the longitudinal axis half carbonized pieces of wood remain which decreases the quality of the charcoal.

Even though it is possible to use vertical retorts having a single chamber or two chambers with which it would also be possible to carry out the process of the present invention, retorts having at least three chambers are preferred for the following reasons:

If the retort were to comprise a single chamber, the distilling gases would be sent to the chimney 44 (see Figure 1) during the step of charging said retort, with the consequent loss of said distilling gases and the risk of an explosion; furthermore after having charged such a single chamber retort with wood, complete carbonization thereof must be effected before said retort can be discharged, which requires considerably more time than if a retort of three chambers is used, and thus decreases the efficiency of the equipment, because after a certain time the volume of semicarbonized wood is smaller than the volume of the charge of wood when charged into the single chambered retort and thereby an appreciable portion of the chamber is empty, which in other words means, that it does not work.

If a retort of two chambers were to be used, the same drawback as to the empty part of the chambers as explained above in connection with the single chambered retort exists, although on a smaller scale. Furthermore, bearing in mind that the heights of the two chambers are greater than the chamber heights of a three chambered retort of the same total height, the interval between discharge and discharge of charcoal is larger due to the fact that the upper part of the lower chamber of a two chambered retort has a temperature considerably smaller than the upper part of the third or final chamber of a three chambered retort.

Another advantage of a retort having superposed chambers in accordance with the present invention is that the lumps of wood after entering into the primary chamber 66 are shifted twice, the first time when passing from the primary chamber 66 to the secondary chamber 67 and the second time when passing from the secondary chamber 67 to the final chamber 68. During the shifting, the lumps of wood under carbonization change their individual positions whereby some kind of stirring up of the lumps occurs which enables more uniform carbonization to be obtained due to the compensating differences in the heat intensities at the new positions which the lumps occupy after redistribution. These facts are of considerable importance because both in economy in the hours of carbonization as well as a more uniform charcoal is obtained. It has to be pointed out, that these movements of the lumps of wood when passing from one chamber to the next chamber do not involve breakages of importance because the lumps of wood when passing from the primary chamber 66 to the secondary chamber 67 have always started to carbonize and when in that condition the knocks they receive usually can not break said lumps. Similarly when the lumps pass from the secondary chamber 67 to the final chamber 68, the carbonization is not yet completed so that the breakages if any are not of substantial importance.

Furthermore it has to be pointed out, that the three chambered retort has the advantage of maintaining the production substantially constant, which is very important especially as far as the volume of gas produced is concerned. Similarly the lumps of wood gradually increase their temperature during the time the process requires for completion, starting from the moment of penetrating into the preheating tunnel 4 until they are discharged as charcoal. The time of the process depends on the type of wood used; an average is 30 hours. The progressive temperature increase has a remarkable influence on the size of the resulting charcoal as well as on its friability and its mechanical strength.

The final chamber 68, where the carbonization is concluded, will be at approximately 650 to 500° C., which is a good guarantee for the total carbonization and the elimination of pitch substances which decrease the value of the charcoal. The secondary chamber 67 will be at approximately 500 to 350° C. and the primary chamber 66 will be at a temperature of approximately 350 to 200° C. The preheating channel 4 will be at approximately 180° C. in the section corresponding to the upper platform 40 which is the part of the tunnel immediately above each retort 41 and at a temperature of approximately 60° C. in the base section 42 which is the part corresponding to the exit of the gases through chimney 44. Anybody skilled in the art will understand that the progressive temperature increase constitutes an ideal solution of the problem of obtaining high quality charcoal, to be achieved.

Figure 3:
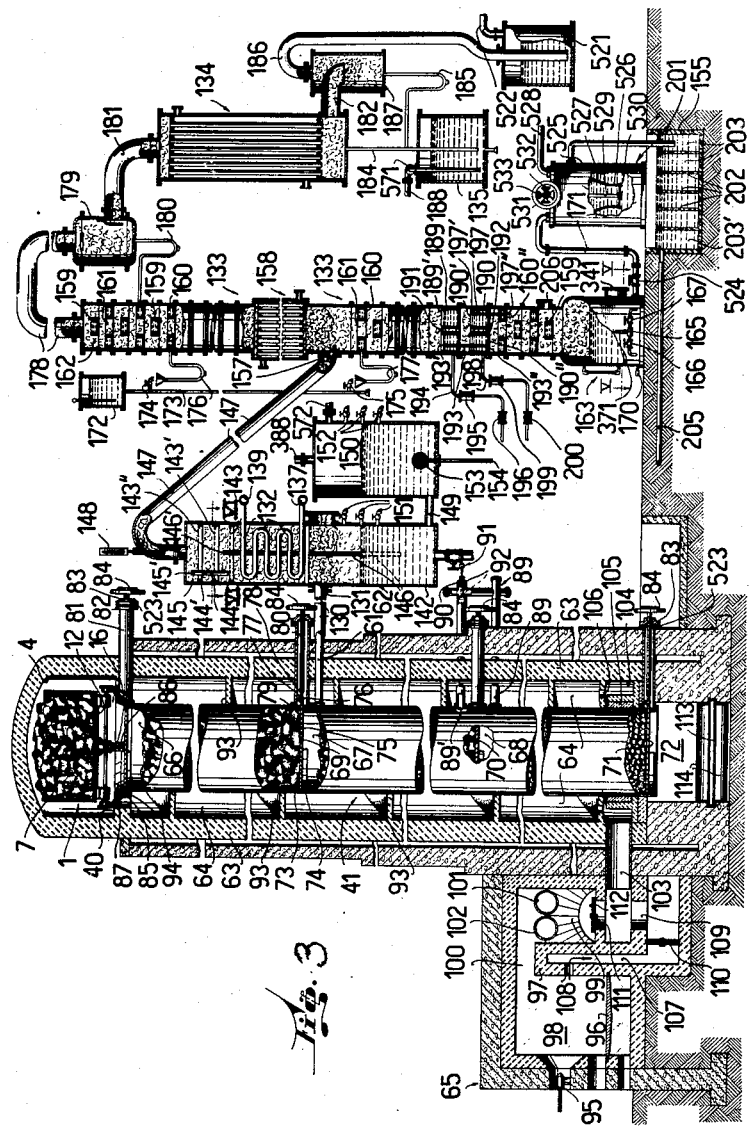
Figure 3 is a side elevation, partly in section, of a wood carbonizating retort connected to a tar separator, a tar purifier and a de-spiriting tower.

The retort heating gases which pass to the tunnel 4, are produced in the furnace 65, which comprises a gas burner 95 therefor (see Figure 3). The gas for said burner 95 is produced in the plant of this invention and constitutes also a wood carbonizating by-product, as will be seen later on. A grid 96 is however provided in the furnace 65 to enable the burning of additional lumps of wood, in case a larger amount of calories is desired to be forwarded than that which the gas burner 95 is capable of providing, which is for instance the case during the starting up period of the plant. The furnace 65 is divided by a panel 97 into a combustion chamber 98, in which the gas burner 95 and the grid 96 is housed and a heating chamber 99 connected at their respective upper parts by means of a duct 100. A tar cracking cylinder 101 and a calcium acetate thermic decomposition cylinder 102, to which reference will be made later on, are housed in said heating chamber 99.

A pipe 103 connects the furnace 65 with the channel 64 of each retort 41, to which end said pipe 103 opens into a ring 104 duly insulated by an insulating layer 105 of the retort, said ring 104 having a series of openings 106 connecting said ring 104 with said channel 64. The panel 97 has an internal conduit 107 connecting the combustion chamber 98 by means of the openings 108 and 109 with the pipe 103. A register 110 enables the flow of the gases through said conduit 107 to be controlled. On the other hand, the heating chamber 99 is also connected to the pipe 103 through an opening 111 provided with a register 112. By suitable setting of the registers 110 and 112, the flow of the heating gases towards channels 64 may be duly controlled.

Returning now to the discharge of the charcoal when opening the discharge panel 71 (see Figure 2) the charcoal falls onto a conveyor 113 preferably a metallic conveyor, provided with a plurality of charcoal transporting buckets 114 for transporting and raising the charcoal in the vertical section of tunnel 115 and to discharge the charcoal onto a horizontal conveyor 116, which preferably extends partially over the charge openings 117 of charcoal cooling silos 118, arranged in rows within common concrete chambers 119. Each silo 118 is provided at its upper part with an upper panel 120 controllable from the outside by means of a handwheel 121 and a lower panel 122 also controllable from the outside by means of a handwheel 123 for discharging the charcoal from the silos 118 once it is cooled off.

Each silo 118 is in functional relationship with an inclined panel 124 which may be inserted in the path of the horizontal conveyor 116 and is inserted after opening the upper panel 120 of the corresponding silo which inclined panel 124 forces thereby the red-hot charcoal (approximately at 300° C.) into the corresponding silo 118. Once said silo is fully charged, the inclined panel 124 is lifted and the upper panel 120 is closed and a similar process is carried out for charging another silo. It is important that the tunnel 115 is substantially perfectly shut off from the outside in order to avoid the entry of air, because the atmospheric oxygen would produce the immediate ignition of the charcoal.

The concrete chamber 119 has in its base portion 125 a plurality of openings 126 which enable the admission of cooling air into said chamber 119 for cooling off the charcoal contained in the silos 118, which air is extracted from the upper part of said chamber 119 by an extractor 127 which sends the hot air through the transport duct 128 into the middle part (not shown) of the inclined section 43 of the preheating tunnel 4. The base 125 is positioned at a certain height above the ground 129 so as to enable to lodge under the lower panel 122 a waggon or a train (not shown) for receiving the cooled off charcoal from said silos 118.

As has already been explained, the gaseous products which are separated from the wood during its carbonization in the retorts 41 are collected by the collecting tube 61 (see Figures 2 and 3) and are led to the main collector pipe 130 of larger cross section, which leads said gaseous products into the tar separator 62.

The tar separator 62 is provided in the part above the opening 131 at which the main collector pipe 130 ends, with a plurality of temperature control coils 132, through which mainly crude methanol passes as cooling means, which methanol, as will be seen later on, is obtained in the despiriting tower 133 where the pyroligneous acid is treated. To this end, the de-spiriting tower 133 is connected through a condenser 134 to a container 135 connected through pump 571 and pipe 188 to tank 136 (see Figure 2) in which the crude methanol, amongst other products as will be seen later on, is collected. The tank 136 is connected to the lower ends 137 of coils 132 of the tar separator 62 through pipe 138, whilst the upper ends 139 of the coils 132 are connected to pipe 140, which leads the crude methanol as well as said other products, into an alcohol rectifying tower 141. By "crude methanol" is to be understood methanol with by-products and impurities.

Thus the gases arising from the retort 41, when entering the tar separator 62 strike against and flow past the ducts of the temperature controlling coils 132, where a condensation of the parts having a high distilling point, such as the tars and the oils, is produced, which are collected at the bottom part 142 of the tar separator 62.

The gases which are not condensed continue to flow through a plurality of wire nets 143, 143' and 143" (see Figures 3 and 6) where the last small drops of the heavy tars are retained, which may have escaped the condensing action of coil 132. A conduit 144 connects the intermediate wire net 143' with the lower net 143 and a conduit 145 connects in a similar way the upper net 143" with the intermediate net 143'. A duct 146 connects the space formed between the intermediate net 143' and the lower net 143 with the bottom part 142 of the tar separator 62. This series of conduits 144, 145 and duct 146 have their respective upper ends 144', and 145' and 146' at a certain height from the net through which they pass, so that formation on said net of a volume of liquid, the height of which is larger than said certain height, will cause part of said liquid to enter the duct or conduit through the respective upper end 144' to 146' whereby said liquid will successively descend until it reaches the bottom part 142. These conduits 144, 145 and duct 146 are necessary because the speed of the gas stream coming from the opening 131 is such that it does not allow the free fall of the condensed particles towards the bottom part 142.

The condensed products which are stored in the bottom part 142 separate by settling into a lower fraction of tar and an upper smaller fraction comprising acidic waters and a small portion of pyroligneous acid. Due to the high temperature at which the gases enter through the opening 131 (approximately 300° C.) into the tar separator 62, a new evaporation of the acidic waters of the bottom part 142, will be produced.

By "acidic waters" is to be understood the mixture of the light products and the pyroligneous acid.

The evaporated parts will raise together with the gases and leave the tar separator 62 through a pipe 147 which leads said gaseous products into the de-spiriting tower 133. A thermometer 148 enables the temperature of the gaseous products, which leave the tar separator 62 to be controlled. If the thermometer 148 indicates an incorrect temperature, it has to be understood as meaning that the separation of the tar is not carried out in the desired manner and therefore the volume of crude methanol must be varied so that the heat controlling coil 132 reestablishes the normal conditions.

Meanwhile the settled tar passes through conduit 149 into the tank 150. Both the tar separator 62 and the tank 150 are provided with a series of bleeding cocks 151 and 152, respectively, which allow any acidic waters which might have remained in the tar separator 62 or passed to the tank 150 to discharge so that finally the substantially dehydrated mixture of tar and oils remains in the tank 150 which is provided in its bottom part with a filter 153 for a pipe 154 which feeds the tar through a number of devices amongst which is a pump 204 and which devices will be described later on, into the tar cracking cylinder 101 (see Figure 2).

The acidic waters which are discharged either at the tar separator 62 or at the tank 150 or at both, are added to the thermic pools 155 (see Figure 2), which will be later on explained.

The gases and steam which leave the pipe 147 of the tar separator 62, constitute a series of non-condensable products at approximately 150° C. and enter the de-spiriting tower 133 through opening 157 arranged immediately below a condenser 158 located approximately at half the height of said de-spiriting tower 133.

This tower 133 consists mainly of two series of cascade overflow containers 159 and 160, both above and below the condenser 158. These well known overflow containers 159 and 160 are formed of central containers 159 and annular containers 160, the central opening 161 of the annular containers 160 has a cross-section of approximately the same size as the central container 159 so that when a central container 159 is full of liquid and said liquid starts to overflow as a cascade, it will pass through the annular exterior space 162 into the annular container 160 arranged immediately below the central container 159 under consideration. Similarly, when the liquid starts to overflow in an annular container 160, it will pass through the central opening 161 into the central container 159 arranged below the annular container 160 under consideration.

The lower part of the de-spiriting tower 133 is a boiler 163 in which a coil is arranged which receives steam through the admission 165 connected to a main steam feeding pipe 371 to which reference will be made later on, and which steam can be injected into the boiler 163 by opening and closing valves such as the valves 166 and 167. The spent steam is discharged through the discharge duct 170.

Due to the heating of the liquid housed in the boiler 163, the light gaseous products separate and rise in the tower 133, whereby the downwardly flowing liquids will release during the cascades formed between each overflow container the volatile products which they may entrain, whereby all the alcoholic portions are separated from the liquid parts.

By "gaseous products" is to be understood the mixture of fixed gases, vapors and steam.

The boiler 163 has a discharge pipe 171 arranged in the lower part and to which reference will be made later on.

The de-spiriting tower 133 has in its lower part a manhole 206 and the boiler 163 has also a man-hole 341.

The object of the condenser 158 which is supplied with cold water from a supply source (not shown) is to lower the temperature of the pyroligneous acid and combustible or fixed gases which enter opening 157 at approximately 150° C., to 80° C., for producing the retrogradation of the acetic acid contained in the pyroligneous acid and to obtain as head products an alcoholic gaseous product of approximately 25%. As illustrative information it may be added that normally the pyroligneous acid contains about 4% of alcohol when entering the de-spiriting tower.

The fixed gases and alcoholic vapors rise together with the head products which are the acyclic amines, the ammonia, the aldehydes and acetone. In order to control and regulate the separation of the head products in accordance with requirements, that is to say to obtain the methanol with the desired impurities in order to be able to use said impure methanol in the formation of the carburetant as explained in the introduction of this specification (the main impurities of the methanol are the butanone, the methylacetone, the acetone, the acyclic amines and more particularly the methylamine, the dimethylamine, trimethylamine and the pyridine), an auxiliary tank 172 is positioned at approximately the same height as the upper end of the de-spiriting tower 133, said auxiliary tank having a discharge duct 173 provided with an upper cock 174 and a lower cock 175 debouching into the supply ducts 176 and 177, respectively, which enter into the de-spiriting tower 133 above the condenser 158 and below the latter, respectively, said auxiliary tank 172 contains either an aluminic solution, mineral acids (preferably sulphuric acid) or if not organic acids such as tannic acid.

The use of these correcting substances or neutralizing and precipitating solutions is based on the following criterion:

When it is desired to neutralize the excess of amines and of ammonia besides precipitation of the soluble tar (which is also carried out by said correcting substances), cock 174 is opened so that the neutralizing and precipitating solution enters the tower 133 above the condenser 158, and when it is desired that the amine and ammonia may rise freely in the tower, said cock 174 is closed and cock 175 is opened instead, whereby the correcting substances enter below opening 157 for precipitating only the soluble tar. It is obvious that any intermediate result may be achieved by conveniently opening both cocks 174 and 175.

Thus the gaseous products which contain an alcoholic portion of about 25% leave the de-spiriting tower 133 through pipe 178 and enter the dephlegmator 179 located between said pipe 178 and the condenser 134. The alcoholic mixture at about 25% contains small portions of amines, ammonia, acetone and methylacetone. When passing through dephlegmator 179, an aqueous part of the vapors is condensed and unavoidably entrains with it an alcoholic liquid part, all of which return through conduit 180 into the upper part of the de-spiriting tower 133, in order to be treated again. The rest continues its path through tube 181 entering into condenser 134 where the condensable parts of the gaseous products are condensed, the condensate then flowing through pipe 184 to a condensate tank 135. The non-condensable fraction (and possibly some remanent condensable products entrained thereby) pass through the discharge pipe 182 into dephlegmator 187 which is located between the condenser 134 and the deposit 135 and retains such liquid particles as may have been entrained by the combustible gases as they flow to scrubbers 183.

The pipe 184 directly connects condenser 134 with tank 135 and a pipe 185 connects the bottom of the dephlegmator 187 with the pipe 184. The dephlegmator 187 is provided at its upper part with a pipe 186 which enters into neutralizing container 521 containing an alkaline solution, for instance calcium hydrate, for neutralizing any acetic acid which may have been entrained. The washed gases continue their path through duct 522 towards the lower portion of one of the scrubbers 183 which forms part of the equipment for treating the combustible gases as will be explained later on, and which are forwarded to the gas burner 95 of the furnace 65 (see Figure 3).

The tank 135 is connected to the tank 136 by means of the pipe 188 (see Figure 2), and thus it may now be understood wherefrom the cooling liquid for the refrigerating circuit of the temperature controlling coil 132 of the tar separator 62 comes from. It still has to be pointed out that the lower part of the de-spiriting tower 133 is provided with two special containers 189 and 190, the latter of which, that is to say, container 190 is the lower container of both. The object of these special containers is to separate the soluble tar and to eliminate it from the de-spiriting tower 133 by means of the addition of the substances forwarded by the auxiliary tank 172. If sulphuric acid is used, a precipitation of the soluble tar is produced which is separated in the special containers 189 and 190. To this effect the precipitated tar successively descends in the overflow containers 159 and 160 together with the pyroligneous acid and finally enters the upper special container 189 of larger height than the overflow containers 159 and 160. Usually the special containers are of approximately 0.50 m. Each of said special containers has a simple opening 191 and 192, respectively, the cross-sections of which are sufficiently narrow to stop the liquid which accumulates in said special containers from passing through said central openings 191 and 192, due to the fact that through said central openings the gaseous products which are generated in the lower part and specially in the boiler 163 rise. In fact, if it is borne in mind that the cross-section of the central openings 191 and 192 is smaller than that of the central openings 161 and the annular openings 162, it will be understood that the gaseous products will increase their speed or pressure when passing through said central openings 191 and 192, whereby the downward movement of the liquid stored in said special containers 189 and 190 is avoided. Thus the liquid will start to accumulate and to separate into its components, soluble tar and pyroligneous acid, in the upper container 189 where it has sufficient time to correctly precipitate the soluble tar by the precipitating action of the sulphuric acid and whereby the pyroligneous acid will float on the top of said soluble tar.

The special upper container 189 is connected to the special lower container 190 by means of a conduit 193, the upper end 193' of which is located below the upper edge 189' of the special container 189 and the lower end 193" is located adjacent the bottom 190" of the special container 190; thus the pyroligneous acid which floats on the soluble tar in the special container 189 is discharged through conduit 193 towards the special lower container 190 and obviously the discharge will start when the level of the pyroligneous acid tends to rise above the upper end 193'. The soluble tar stored in the special upper container 190 is discharged through pipe 194 provided with an inspection window 195 and a control valve 196. Said valve 196 is closed by the operator when he observes at the inspection window 195 that pipe 194 does not discharge soluble tar but starts to discharge pyroligneous acid which he realizes by the change of colour of the liquid.

The special lower container 190 is used in order to repeat the above described operation, so that the pyroligneous acid, which may have entrained portions of soluble tar, is again treated in order to precipitate said soluble tar. The accessories of the lower special container 190 are of the same type as those explained with regard to the upper special container 189, or in other words, the upper edge 190' is arranged at a greater height than the upper end 197' of conduit 197, which connects the special container 190 with the overflow container 160 located below the special container 190. To this end the lower end 197" of discharge tube 197 is located adjacent the bottom 160" of the overflow container 160. A pipe 198 having an inspection window 199 and a control valve 200 controls, like pipe 194, the discharge of the soluble tar precipitated in the lower container 190, whilst conduit 197 discharges the clarified pyroligneous acid into the following lower overflow container 160. The soluble tar which is discharged through pipes 194 and 198 is added to the tar stored in the tank 150 by passing through collector pipe 572 (see Figure 2). It will be understood that if the control valves 196 and 200 are properly manipulated, that a continuous operation, as far as the de-spiriting tower 133 is concerned, can be obtained.

The warm pyroligneous acid free of oils and tar reaches thus the boiler 163 and is discharged at the lower end through pipe 171 (see also Figure 2), and passes through control valve 524, into the neutralizing tank 201. This neutralizing tank 201 consists of an outer tank 525 and an inner duct 526 preferably partially conical as indicated at 527 to facilitate the charge of the pyroligneous acid forwarded by pipe 171. A pipe 528 also enters into the interior duct 526.

Pipe 528 supplies calcium hydrate produced in the hydrating equipment shown in Figure 7 and to be explained later on.

A shaft 529 passes through duct 526 and supports at its lower end and adjacent the free end of duct 526 a helix 530. A pulley 531 mounted on a shaft 533 supported by a support 532 (see also Figure 7), transmits its movement to shaft 529 by means of a bevel gear transmission 603.

It will be understood that the ingredients which are discharged into duct 526 through pipes 171 and 528 are mixed, the pyroligneous acid and calcium hydrate being thoroughly mixed by said helix 530 which rotates at high speed and projects the liquids with great centrifugal force towards the walls of the outer tank 525. The pulley 531 receives its movement from a driving source which is not shown.

The pyroligneous acid is thus converted, by means of the calcium hydrate, into calcium acetate.

In order to obtain always an adequate neutralization, both pipes 171 and 528 are provided with control valves 524 and 534, respectively (see Figure 7).

The calcium hydrate is produced by means of the equipment shown in Figure 7. A railway line 535 or a street passes by a pit 536 into which the waggons 537 or the tracks may discharge over the inclined surface 536' their charges of calcium oxide into said deposit 536. A conveyer 538 provided with buckets 538' lifts the calcium oxide and discharges it into a hopper 539 towards a channel 540 provided with a screw conveyor 541 which transports the charge towards the discharge end 542. A water shower produced by a perforated duct 543 is arranged along and above said channel 540 and connected to a supply source (not shown) through supply conduit 544. Thus the calcium oxide which enters hopper 539 is transformed into calcium hydrate during its passage towards the discharge end 542 which discharges the calcium hydrate onto one or more vibratory sieves 545

(only one shown). In case several sifts are used, these are superposed and the mesh of a lower sieve is always finer than that of the immediate upper sieve, whereby a sifting of the calcium hydrate is carried out in successive steps.

In the embodiment shown, this sifting action is carried out by a single sieve 545 to separate the foreign particles from the calcium hydrate, so that a slurry of calcium hydrate is deposited into a receptacle 546 located below the sieve 545. The discharge pipe 528 delivers said calcium hydrate, as previously explained, into the neutralizing tank 201.

The calcium acetate thus formed in the tank 201 is discharged into the precipitating and clarifying pool or container or thermic pool 155 (see Figures 2 and 3). In order to clarify the calcium acetate and increase the length of path of the calcium acetate in said thermic pool 155, the latter is provided with a plurality of substantially vertical panels 202, which divide the pool 155 into a plurality of compartments 203. These panels 202 act as weirs and thereby the calcium acetate, when reaching the last compartment 203', can be considered as substantially clarified and is taken up then by the pump 204 which is a double pump, as will be seen later on, and is connected on the one hand to the last compartment 203' through duct 205 and on the other hand to the calcium acetate decomposition cylinder 102 (see Figure 3), where the calcium acetate is transformed into acetone and by-products, as will be seen later on.

As has already been stated, the alcoholic liquid at about 25%, obtained in the de-spiriting tower 133 and constituting the refrigerating liquid for the tar separator 62 is led, once it has been preheated, into a rectifying tower 141 through pipe 140.

As a matter of interest, it may be said that the liquid which enters the rectifying tower 141 has approximately the following composition:

| | Percent |
|---|---|
| Water | 75.000 |
| Methylalcohol | 19.300 |
| Acetone and other ketones | 3.500 |
| Methylacetate | 8.600 |
| Allyl alcohol | 0.075 |
| Aldehydes | 0.250 |
| Ammonia and amines | 0.150 |
| Hydrocarbons | 0.375 |

The condensed fraction from the rectifying tower 141 continues its downward movement until it reaches the boiler 214 (see Figure 2) to which reference will be made later on.

An auxiliary tank 211 connected to the upper part of the rectifying tower 141 through duct 212 provided with a control valve 213, contains a sodium hydrate solution or calcium hydrate solution for precipitating the phenols and for destroying the aldehydes which are entrained downwardly with the flow of liquid which progressively passes to the boiler 214. Said boiler 214 is provided with a heating coil 215 which receives steam through duct 216 connected to the main steam feeding pipe 371 to which reference will be made later on, and which coil 215 discharges the used steam through discharge conduit 218. The supply duct 216 and the discharge conduit 218 are each provided with a control valve 217 and 219, respectively.

The heating coil 215 functions to increase the temperature of the liquid deposited in boiler 214, in order to evaporate the alcoholic vapors and other volatile products. The precipitated phenols, the water and other impurities, which are accumulated in the boiler 214, are discharged as residues through discharge pipe 220.

The alcoholic vapors together with the required impurities, or in other words the methanol with the butanone, methylacetone, acyclic amines and the pyridine leave the upper part of the rectifying tower 141 through pipe 221 and enter condenser 222 which allows the passage of the pure vapors whilst the remaining fractions are condensed and returned through duct 223 to the rectifying tower 141. The pure vapors are discharged through duct 224 into a refrigerator 225 where they are cooled off and discharged through pipe 226, and test tube 227 (which enables the quality of the distillate to be checked) and then to the storage tank 228 until it is further used in the carburetant, as previously mentioned.

Even if the condenser 222 and the refrigerator 225 are not specifically described because they are well known, it is obvious that the ducts, 222' and 225', respectively, form the admission ducts for the cooling fluid, and ducts 222" and 225", respectively, form the corresponding discharge ducts. Usually water is used as refrigerating fluid supplied by a suitable source, not shown.

The supply pump 204 both for the tar and for the calcium acetate liquor comprises two pumps 229 and 230 of substantially identical structure. Pump 229 is connected to the supply pipe 205 and to a flexible conduit 231 connected to the feeding device in the calcium acetate decomposition cylinder 102, as will be described later on. Pump 230 is connected through pipe 154 to tank 150 and through flexible conduit 232 to the feeding device for the tar cracking cylinder 101.

The vapors and gases which have been formed in the cracking cylinder 101 within which connecting rod 280 reciprocates hollow stem 250 having a discharge pipe 277 and which have entered into dephlegmator 310 leave the latter through the upper part and more particularly through connecting pipe 334 to enter into a condenser tower 335. Said tower consists of a plurality of lower bubble containers and a plurality of upper bubble containers separated by a multitubular condenser 338. A backflow pipe 343 connects the base of condenser 335 with the dephlegmator 310.

A pipe 344 enables the discharge of the gaseous head products from the condenser tower 335 and leads them to pipe 522 (see Figure 2) which leads said gaseous products to the scrubbers.

Thus the uncondensable or fixed gases are discharged through pipe 344 and are, as previously stated, added to the uncondensable or fixed gases produced in the wood carbonization, as previously described.

Meanwhile the condensed liquids, mainly the aromatic hydrocarbons, the acyclic hydrocarbons of the saturated series and the hydrocarbons of the ethylene series move downwards through the backflow pipe 343 the dephlegmator 310. The backflow of these cold liquids refrigerates the prolongation 307' of the exit duct of the tar cracking cylinder 101, whereby coking of the heavy parts which rise in said prolongation 307', is avoided. Precisely due to these facts, it is not necessary that a scraper piston cleans also the internal walls of the prolongation 307'.

These liquids supplied by the backflow pipe 343 are heated up in the dephlegmator 310 and leave the latter through discharge pipe 348 (see also Figure 4). This discharge pipe 348 passes through the upper part of heating chamber 99, duct 100 and combustion chamber 98 where it is preheated to approximately 120° C. and thereafter enters the central part of boiler 349 of the purifying tower 350 (see Figure 2).

Pitch is discharged through discharge pipe 358 (see Figure 2) into waggons 360, consisting of a heat insulated container 361 (lagged for instance with glass fibers) inside of which is housed a mixing device consisting of a mixing propeller (not shown), mounted on a shaft, the end of which passes to the outside whereon a pulley 363 is mounted and connected to a driving unit 364 by means of a belt 365 which driving unit is provided with a driving pulley 366.

This waggon 360 is first charged with a mixture of wood chips obtained during the breaking up of the wood intended for carbonization, and the carbonaceous residues obtained in the sinks of the cracking cylinder 101 and discharged into the waggons and the charcoal dust residue separated from the cooled off charcoal, cooled off in the silos 118.

The liquid pitch is discharged into said mixture, and the mixing device 362 to 366, forms a good mixture of all the components. This mixture is produced while the waggon 360 is transported towards a briquet forming plant (not shown) where its contents are discharged and the briquets are formed.

Thus a briquet is obtained, the calorific power of which is about 9,000 calories. This briquet does not fall into bits on the grids nor does it conglomerate with others to form compact blocks, when subjected to high temperatures. Besides it may be stored outdoors, because water substantially does not affect it.

The evaporated liquids in the boiler 349 rise in the purifying tower 350 (see Figure 4), which is provided with a plurality of bubble containers 367 of a structure similar to that of the bubble containers of the condenser tower 335.

The purifying tower 350 is provided with a lower stripping section 368 and an upper stripping section 369 in which the different portions, which will be thereafter accumulated are stripped or purified.

The main steam feeding pipe 371 connected to a steam supply source (not shown) and to which reference will be made later on when analysing the decomposition of the calcium acetate, supplies steam not only to branches 372 but also to a further number of branches, as has already been seen and will be seen later on, for providing steam at all the parts of the plant which require steam.

In the part of the plant now under consideration or in other words, the stripping sections 368 and 369 steam is supplied to each chamber 370 through a valve 373 and a coil 353 provided with openings which enable the steam to be injected into the said chambers 370, which are subdivided in the lower part by means of a plurality of panels 374 whereby a plurality of lower chambers is formed. Said panels 374 are provided alternatively with openings, adjacent the central duct 518 through which the vapors and gases rise and enter into the chamber (see also Figure 4) and with openings adjacent the periphery of the respective stripping sections 368 and 369.

Thus the condensed products, which have to follow the undulating path in the lower stripping section 368 and the upper stripping section 369 are subjected to heating and distillation which assures that the volatile products will rise before the liquid hydrocarbons leave the lower stripping section 368 through the discharge pipe 375 below panel 374' and through the upper discharge pipe 376 the upper stripping section 369. It is important to maintain a constant temperature in the stripping sections 368 and 369 in order to collect always the same hydrocarbons as will be immediately explained.

Both discharge pipes 375 and 376 are provided with control valves 377 and 378, respectively. These pipes 375 and 376 are connected to cooling coils 379 and 380, respectively, each arranged in a cooling tank 381 and 382, wherefrom the hydrocarbons are discharged in liquid state into schematically shown storage tank 383 and 384 passing previously through the control or test tubes 385 and 386, respectively. The way in which said cooling coils 379 and 380 are refrigerated, will be explained later on.

As is well known, the control tubes are all provided with a breather tube such as tube 387 in the control tube 385, which is connected to atmosphere whereby the generation of a back that a counterpressure in the discharge pipe is avoided.

The lower storage tank 383 (only schematically shown) will collect the products which are within 220° C. and 180° C. approximately, which form the acid hydrocarbon compounds mainly formed of phenol, cresol, crecineol and cineol.

Storage tank 384 (only schematically shown) corresponding to the middle portion of the purification tower 350, will collect the products mainly formed of neutral oils with distilling point approximately between 150° C. and 180° C. These neutral oils are again subjected to cracking in the tar cracking cylinder 101, to which end, pipe 388 leads said neutral oils to the tank 150 (see Figure 2).

The uncondensed products leave the upper part of the purifying tower 350 through pipe 389 and enter a multitubular condenser 390 in which the head products are cooled off and condensed and are discharged through pipe 391, control tube 392, discharge pipe 557 into schematically shown storage tank 393.

The discharge pipe 557 as well as the similar pipe of control tubes 385 and 386 opens into the respective storage tank 393, 384 and 383 near the bottom thereof. The multitubular condenser 390 is provided in its lower chamber 558, besides pipe 391, with another tubular connection 559 which enters a dephlegmator 560 of structure similar to that of dephlegmator 187 of the de-spiriting tower 133. A discharge pipe 561 for the liquid parts which may have been entrained, connects said dephelgmator 560 with the storage tank 393. The upper part of dephlegmator 560 is connected to a suction fan 562, the discharge opening 563 of which is directly connected to atmosphere.

Returning now to the condenser tower 335 the gaseous discharge pipe 344 of said tower is provided with a pressure regulator 564 schematically shown and well known and intended to control the pressure on both its sides and more particularly the pressure in the condenser tower 335 and in the dephlegmator 310.

Considering now the assembly of the dephlegmator 310, discharge pipe 348, boiler 349 and purification tower 350, as far as its operative aspect is concerned, the following has to be pointed out:

The boiler 349 is heated by means of furnace 565 whereby the volatile parts rise from the remaining pitch, and thus a pressure is generated in the boiler 349 which tends to stop the discharge of the liquid delivered by discharge pipe 348 connected to dephlegmator 310. In order to overcome this difficulty the pressure regulator 564 is provided, which assures that a certain pressure is maintained in dephlegmator 310 on the liquid in said dephlegmator 310, which pressure is able at least partially to counteract the pressure existing in boiler 349. However, sometimes the pressure which is generated in the boiler 349, is too high in relationship with the pressure existing in the dephlegmator 310, and therefore the dephlegmator 560 with the suction fan 562 is provided, which cooperates in assisting the gases to rise in the boiler 349 and purifying tower 350, whereby the pressure in said boiler 349 is sufficiently reduced to assure the free discharge of liquids through the discharge opening in tower 335. It is therefore important to correctly balance the operative power of the suction fan 562 and the pressure regulator 564.

The hydrocarbons stored in the storage tank 393 form the back-bone of the carubretant for internal combustion engines and consist of acyclic hydrocarbons of the saturated series, saturated hydrocarbons of the polymethylene series and benzene hydrocarbons.

The multitubular condenser 390 receives its refrigerating water from a source, not shown, which supplies it through supply pipe 394. The used water is discharged through discharge pipe 395 and enters pipe 396 which delivers it to the lower end 382' of the cooling tank 382, the used water being discharged through the upper end 382" from which it is supplied through pipe 397 into lower end 381' of refrigerator or cooling tank 381 and is finally discharged at the upper end 381". Thus the same cooling water is used for successive steps, which is possible due to the fact that the temperature in the multitubular condenser 390 and cooling tanks 382 and 381 increases progressively.

Returning now to Figure 2, and more particularly to the thermic pool 155, the decomposition of the clarified calcium acetate, will now be analyzed. The clarified calcium acetate, stored in the last compartment 203' is taken up by pump 229 through pipe 205. This pump 229 sends the calcium acetate liquor through flexible duct 231 to the atomizing head 398 (see Figure 5) of piston 399 mounted on stem 400. The atomizing head 398 is slideably arranged in the calcium acetate decomposition cylinder 102, partially housed in heating chamber 99, as has already been described, and is provided at its respective ends with sinks 401, all of which has already been described both from the structural.

A pipe 402 delivers the cooling liquid and a pipe 403 allows discharge of the heated cooling liquid. The cooling or refrigerating liquid is necessary in order to prevent the calcium acetate, which enters into stem 404, from forming incrustations on the internal walls of the duct which is the continuation of the flexible duct, which incrustation would finally block said duct.

The refrigerating liquid is water supplied by a source (not shown) and enters the stem as stated, through duct 402 and leaves the former through duct 403. The warm water is sent to a boiler (not shown) provided with its corresponding furnace and accessories for generating the necessary steam required in the several parts of the plant, as has already been seen and will be further seen later on, which steam generating boiler is connected to the main supply steam pipe 371.

As in the tar cracking cylinder 101, the calcium acetate decomposition cylinder 102 is provided at its upper middle part with an opening 404, to which an exit duct 405 extending into a dephlegmator 406, is provided. During the working stroke, the atomizing head 398 projects a finely divided spray of calcium acetate liquor against the internal wall 407 of the calcium acetate decomposition cylinder 102. The finely divided spray forms a film on the internal wall 407, where the water is almost instantaneously evaporated and thereafter immediately the drying action of the paste starts, whereupon the dry paste decomposes, at which state the calcium acetate has reached a temperature exceeding 300° C.

Thus steam, acetone, methylacetone and acetone oil vapors are produced which leave the calcium acetate decomposition cylinder 102 through opening 404 and enter the dephlegmator 406. The residual ashes are discharged into sinks 401.

By "acetone oils" are to be understood a mixture of substances obtained as byproducts of the purification of the crude acetone, said byproducts being derived from the higher ketones produced during the treatment of the calcium acetate liquid which has been formed from the pyroligneous acid which contain about 5% of acids other than acetic acid (see "La Industria de la Destilación de Leña y sus Derivados," Juan A. Yantorno, Buenos Aires, 1933, pages 546 ff.; 559 ff.).

The dephlegmator 406 collects the heavy oils and part of the water. The remaining gases and vapors rise into the concentration tower 408, formed of a plurality of cascade containers 409 of the same type and arrangement as the cascade containers 159 and 160 of the de-spiriting column 133 (see Figure 3).

The uncondensed vapors and gases, which is a crude mixture of acetone at 20 to 25%, leave the tower through duct 410 and enter condenser 411, the object of which is to concentrate them even more, whereby a great portion of the water is returned to the concentration tower 408 through a reflux pipe 412, whilst the uncondensed gaseous products having a higher concentration of acetone, are discharged through discharge pipe 413 and enter refrigerator 414, wherein crude acetone is obtained, having a concentration of approximately 25 to 30%.

This solution is discharged through pipe 415 into a dephlegmator 566, the upper part of which is connected through pipe 567 to a suction fan 568 connected to atmosphere, whilst the lower part of said dephlegmator 566 is connected to a discharge pipe 569 which leads the liquid to a precipitating deposit 416 where the acetone oils are separated and float on the surface of the acetone, so that they may pass, when a certain level has been reached, to tank 417, through pipe 418. The suction fan 568 is provided in order to decrease the pressure in the cylinder 102, concentration tower 408 and its accessories, so as to assure that the decomposed portion of calcium acetate in cylinder 102 is immediately withdrawn, whereby to avoid further decomposition of the crude acetone, as this is not desirable for the purpose herein pursued.

Refrigerator 414 and condenser 411 are cooled with water supplied from the water supply source (not shown) which water enters through admission pipe 419 into separator or refrigerator 414 and leaves the upper part thereof through pipe 420 to enter condenser 411 and is finally discharged at the upper part through discharge pipe 421.

It has now to be pointed out, that in order to remove all the traces of acetone from the water and acetone oil, which flow back to the dephlegmator 406, the latter is provided with heating coil 422, supplied with steam from the supply pipe 371 which has already been explained in Figure 4 in connection with purifying tower 350. A valve 423 enables the volume of steam entering coil 422 to be controlled.

The aqueous acetone solution which settles out in tank 416 is ready to enter the acetone rectifying tower 424. A discharge pipe 425 provided with a control valve 426 is arranged in the lower part of tank 416 and permits discharge of the crude acetone which continues on its path through pipe 427 and enters the hollow stem 250. Once the crude acetone is conveniently reheated in the tar cracking cylinder 101, it leaves said stem 250 through pipe 277 and enters the lower part of the acetone rectifying tower 424, in which the preheated crude acetone solution is subjected to a chemical treatment.

The acetone rectifying tower 424 comprises a bottom boiler 428 provided with a heating coil 429 which supplies steam through the main steam feeding pipe 371 said steam previously passing through valve 431. A discharge pipe 432 which at the same time forms a level device for the boiler due to the fact that its discharge opening 432' is arranged at a certain height with regard to the floor assures that the liquids which flow downwardly in tower 424 and enter into boiler 428, stay a considerable time in the boiler 428, the reason for which will be explained later on.

The acetone rectifying tower 424 is provided with a lower bubble container section 433 and an upper bubble container section 434 of the type used in the rectifying tower 141. The upper section 434 is separated from the lower section of bubble containers 433 by an intermediate boiler 435 into which enter the upper part of the lower section of bubble containers 433.

A plurality of discharge ducts 436 connects the bottom section 434' of the upper section of bubbles containers 434 with the lower part of the boiler 436, which discharge ducts 435 are adapted to discharge, the liquid portions of the upper section of bubble containers 434 into said lower part of said boiler 435. A heating coil 437 is arranged in the bottom part of boiler 435 and is supplied with steam by the main steam feeding pipe 371. A discharge pipe 438 having a discharge opening 438' maintains the liquid level in the boiler 435 at a considerable height in a similar way as discharge opening 432' does with the liquid contained in boiler 428, whereby the liquid residues formed in boiler 435 may be discharged.

As has already been stated the crude preheated acetone enters through pipe 277 into the lower section of bubble containers 433 where the liquid portions will fall towards the boiler 428 and the gaseous products will rise in said tower 424. The heating coil 429 which is connected to the main steam feeding pipe 371 is provided with a discharge pipe 430 having a valve, and enables the temperature of the liquid portion housed in the boiler 428 to be raised, whereby the acetone vapors will be separated from said liquid and will rise in the tower 424 bubbling through the lower bubble container 433 whereby the vapors increase each time their content of acetone. These vapors will thus reach the containers 433' where they are treated with a corrective agent such as alkaline solutions supplied by auxiliary tank 439 and its supply pipe 440. A control valve 441 enables graduation of the volume of the alkaline solution, which may be for instance sodium carbonate, sodium hydrate or calcium hydrate. This alkaline solution (or solutions) is added in order to precipitate the remainder of the oils and neutralize the possible entrainments of phenols which are produced by remainders of tar which may have been present in the calcium acetate liquor.

The thus purified acetone vapors rise and bubble in the following bubble containers until they finally reach the boiler 435 to pass thereafter into the upper bubble container section 434.

In this upper section 434 the vapors bubble in the liquid part containing in solution a corrective agent such as mineral acids supplied by auxiliary tank 442 through valve 443 and pipe 444. The mineral acids are necessary for eliminating the amine portions and other impurities which the acetone vapors may still contain.

Thus the pure acetone vapors leave the upper part of tower 424 through pipe 445 and enter condenser 446 which returns to the acetone rectifying tower 424 through pipe 447 the liquid parts which may have been entrained, whilst the acetone vapors are led into refrigerator 448 through duct 449 and in the refrigerator 448 said acetone vapors are liquefied. The liquid acetone leaves said refrigerator 448 through discharge pipe 450 and enters storage tank 451 (only schematically illustrated) previously passing through a test tube 452 provided with a breather pipe 453.

The cooling system of the condenser 446 and the refrigerator 448 is exactly the same as that of condenser 411 and refrigerator 414 and therefore it will not be specifically described.

Meantime the liquid portion which enters boiler 435 through discharge duct 436 and which still contains acetone in solution, is retained a considerable time in said boiler 435 in order to remove any last traces of acetone which said liquid may contain to which effect the heating coil 437 is provided.

From the above explanation in connection with the acetone rectifying tower 424 it may be understood that in view of the double arrangement of boilers and accessories, loss of heat is considerably reduced as compared with known types of rectifying towers which use at least two independent columns, one for the alkaline treatment and the other for the acid treatment. If an equipment with two independent towers is used, no substantial modifications are necessary in the process.

Furthermore this novel tower 424 also enables the total height thereof to be reduced in comparison with the sum of the heights of the known independent towers which also signifies a reduction in the number of bubble containers.

In view of the foregoing statements it can also be understood that the rectifying tower 424 or its structural equivalent can be employed in connection with any other type of distilling process, wherein the fluid to be rectified must be subjected to two different treatments such as the acid and alkaline treatments above described. Obviously if the bubble containers have to be replaced by any other type of container, such as cascade containers previously described, this can easily be done. Therefore this invention intends to cover also this alternative.

The acetone oils part of which, as has already been described, is accumulated in the upper part of tank 417, are also accumulated in tank 454. The acetone oils which are collected in tank 454 are supplied by dephlegmator 406 through pipe 455 which operates according to the same principles of levels as discharge pipes 432 and 438. A discharge pipe 456 which also operates according to the same principle discharges the water contained in tank 454 which is run to waste. A pump 457 takes up from the upper part of tank 454 the acetone oils which float on the water in tank 454, by means of duct 458 and sends said acetone oils through duct 459 into tank 417.

A pump 460 provided with a suction duct 461 which enters tank 417 sends said acetone oils through supply duct 462 into boiler 463 of the acetone oil rectifying tower 464. This boiler 463 is provided with a heating coil 466 having steam discharge openings 467, which coil 466 is connected to the main steam feeding pipe 371 through valve 465.

The acetone oils which enter boiler 463 through valve 468 start to rise in gaseous form, in other words the acetone oil vapors and the water vapors pass through bubble containers (not shown), arranged in tower 464 where different products are separated at different heights; more particularly the heavy oils are collected in the lower part of tower 464 by pipe 469 passing through refrigerator 470 into storage tank 471. The medium oils are collected at a medium height of column 464 by means of pipe 472 passing refrigerator 473 and are stored in storage tank 474 and finally the light oils are collected in the upper part by duct 475 passing through refrigerator 476 and are stored in storage tank 477. All the storage tanks 471, 474 and 477 are schematically shown.

The refrigerating liquid distribution system for refrigerators 470, 473 and 476 is of the same type as that described in connection with purifying tower 350 (see Figure 4).

It is obvious that the separation of the different acetone oils must be made in accordance with the purpose for which they are intended. As an example it may be pointed out that these oils may be used as a denaturant for ethyl alcohol.

The fixed gases form an intermediate product of appreciable value since they may be used as supply material for the gas burner(s) 95 (see Figure 3). These gases have approximtely the following composition:

| | Percent |
|---|---|
| Carbon dioxide | 58 |
| Carbon monoxide | 35 |
| Hydrogen | 4 |
| Oxygen, methane, nitrogen, etc | 3 |

The calorific power of said gases produced during the wood distillaiton may be considerably increased if the high percentage of carbon dioxide is transformed into carbon monoxide. This reduction is carried out by passing the gas through red hot coal or charcoal whereby a combustible gas having a calorific power between 6,000 and 7,000 calories/kg. is obtained.

As the scrubbing process continues, the scrubbing water of the circuit becomes more and more charged with products separated from the fixed gases until the proportion is such that said water cannot be used any more for scrubbing purposes. At this stage, said water with impurities is sent through pipe 487 (see also Figure 2), into tank 136, which contains the crude methanol.

It is obvious that the ingredients of the cited final products may also be used for other purposes or may be sold directly; an example thereof is that the pitch discharged by pipe 358 may be partially or entirely sold as such instead of using it for the formation of briquets.

Another example of different purposes is that the vegetable carburetant may also be used as solvent for greases, fats, oils and resins such as are used in the production of paints and varnishes; in the rubber industry it may substitute the solvents and the aromatic hydrocarbons (benzol, toluel, xylol); in the celluloide industry and in other industries it may substitute the extractors and solvents of high cost.

I claim:

1. In a continuous process for the production of a calcium acetate liquor suitable for the production of acetone therefrom from the gaseous product collected during the carbonization of wood, the improvement which comprises separating insoluble tar from said gaseous product, cooling the remaining gaseous product to an intermediate temperature to simultaneously condense substantially only soluble tar and pyroligneous acid, precipitating said soluble tar with sulphuric acid and neutralizing said pyroligneous acid to produce said calcium acetate liquor.

2. In a continuous process for the production of a calcium acetate liquor suitable for the production of acetone therefrom from the gaseous product collected during the carbonization of wood, the improvement which comprises separating insoluble tar from said gaseous product, cooling the remaining gaseous product to an intermediate temperature to simultaneously condense substantially only soluble tar and pyroligneous acid, precipitating said soluble tar with tannic acid and neutralizing said pyroligneous acid to produce said calcium acetate liquor.

References Cited in the file of this patent

UNITED STATES PATENTS

| | | |
|---|---|---|
| 385,777 | Rumpf | July 10, 1888 |
| 393,079 | Rumpf | Nov. 20, 1888 |
| 1,301,960 | Michie | Apr. 29, 1919 |
| 1,542,535 | Wilkie | June 16, 1925 |
| 1,926,116 | Sheldon | Sept. 12, 1933 |
| 1,974,295 | Alther | Sept. 18, 1934 |
| 2,092,528 | Conbrough | Sept. 7, 1937 |
| 2,101,641 | Cooke et al. | Dec. 7, 1937 |
| 2,177,557 | Bergstrom | Oct. 24, 1939 |
| 2,597,497 | Joris | May 20, 1952 |
| 2,621,150 | Mora | Dec. 9, 1952 |

OTHER REFERENCES

"Acetic Acid From Wood Distillation—Othmer Process," Chem. and Met., vol. 47, pp. 349–352, May 1940. Chem. and Met., vol. 47, pp. 349–352, May 1940.

"Wood Distillation," by M. Klar (Chapman & Hall Ltd.), London, 1925, pages 97–107, 164–168, 195–228, 321–337.

"The Destructive Distillation of Wood," by Brunbury Beun Bros. (London), 1923, pages 137–143 incl., 174 and 256.